United States Patent [19]

Yoshihiro

[11] Patent Number: 4,868,923
[45] Date of Patent: Sep. 19, 1989

[54] TAPE LOADING APPARATUS

[75] Inventor: Mitsugu Yoshihiro, Kanagawa, Japan

[73] Assignee: Sony Corporation, Tokyo, Japan

[21] Appl. No.: 160,482

[22] Filed: Feb. 25, 1988

[30] Foreign Application Priority Data

Mar. 13, 1987 [JP] Japan ................................. 62-58213

[51] Int. Cl.$^4$ ........................................... G11B 15/18
[52] U.S. Cl. ....................................... 360/71; 360/85;
360/95
[58] Field of Search ........................ 360/85, 95, 69, 71

[56] References Cited

U.S. PATENT DOCUMENTS 4,686,591 8/1987 Kobayashi ........................ 360/95 X Primary Examiner—A. Heinz
Attorney, Agent, or Firm—Alvin Sinderbrand

[57] ABSTRACT

In a tape loading apparatus having a loading ring with guides for withdrawing a magnetic tape from a tape cassette and wrapping it around a rotary drum, the rotating speed of the loading ring is controlled in accordance with the loading position, that is, the rotation angle of the loading ring, to protect the magnetic tape from being damaged during a loading operation, and a torque for resisting unwinding of the tape from a reel in the cassette during the loading operation is varied in accordance with the amount of tape wound thereon.

7 Claims, 4 Drawing Sheets

TAPE LOADING APPARATUS

BACKGROUND OF THE INVENTION

1. Field of the Invention

The present invention relates to a tape loading apparatus for use with a rotary magnetic head type recording and/or reproducing apparatus, such as, a video tape recorder.

2. Description of the Prior Art

In a known video tape recorder (VTR) employing a tape cassette, a tape loading operation is performed in which a tape 8 is withdrawn from a tape cassette 1 and is then wrapped around a rotary head drum 9, as shown in FIGS. 1A and 1B.

When the tape cassette 1 is loaded onto a VTR (not shown), as shown in FIG. 1A, loading guides 3, 4 and 5 suitably movable in response to rotation of a loading ring 2 are disposed in a tape withdrawing position. Then, a motor 6 drives a worm gear assembly 7 to rotate the loading ring 2 in the direction indicated by an arrow L and, in response thereto, loading guides 3, 4 and 5 act to withdraw a tape 8 from the tape cassette 1, and to wrap the withdrawn tape around the rotary drum 9 with a predetermined wrap angle, for example, 180° as shown in FIG. 1B, and the loading operation is ended. At the completion of the loading operation, the tape is proximate to a pinch roller 10 and a capstan 11, as also shown on FIG. 1B.

During such loading, rotation of a supply reel 12 in the tape cassette 1 is precluded by a braking force applied thereto, and a take-up reel 13 has a constant torque applied thereto in the direction resisting unwinding of the tape therefrom. In this state, the loading ring 2 is rotated at a predetermined speed to withdraw the tape 8 from the take-up reel 13 and, in response to such rotation of the ring 2, the first to third guides 3 to 5 are sequentially operated to bring the withdrawn tape 8 to the predetermined loading position shown in FIG. 1B.

Due to the somewhat irregular movements of the loading guides 3, 4 and 5 in the course of the tape loading operation and the sudden stop of the tape 8 at the completion of the loading operation or the like, the tape withdrawing speed from the tape cassette may be presented by the solid line in FIG. 2B. Meanwhile, the amount of the tape 8 withdrawn from the tape cassette 1 changes, for example, as shown by a solid line in FIG. 2A.

In the prior art, the rotating speed of the loading ring 2 is constant during the loading operation so that there are sharp changes in the tape withdrawing speed, as represented by steeply inclined portions of the solid line on FIG. 2B.

When the tape cassette 1 is large in size, the inertia of the take-up reel 13 cannot be neglected. Thus, if the torque applied to the take-up reel 13 is constant for resisting unwinding of tape therefrom during each loading operation, there are encountered the following problems.

When the withdrawing speed of the tape 8 is decreased as shown by the solid line in FIG. 2B, if the change in the rotating speed of the take-up reel 13 determined by the inertia of the take-up reel 13 and the torque applied thereto and the change in the tape withdrawing speed are similar, the tape tension is always constant and hence there is no problem. However, the inertia of the take-up reel 13 is increased with the increase of the radius of the tape 8 wound on the take-up reel 13. If the torque applied to the take-up reel 13 is constant, the rate of change in the rotating speed of the take-up reel 13 is changed in response to an increased inertia thereof upon a sudden decrease in the withdrawing speed of the tape. More particularly, if the radius of the tape 8 wrapped on the take-up reel 13 is large, and hence the inertia of the take-up reel 13 is large, the rotating speed of the take-up reel 13, as represented by the broken line in FIG. 2B, changes relatively slower as compared with the rapid change of the tape withdrawing speed, thus causing the withdrawn tape 8 to be slackened. The amount by which the withdrawn tape 8 is slackened increases with the radius of the tape 8 wrapped on the take-up reel 13. In the worst cases, the tape 8 may slip off the loading guides. Further, at the end of the loading operation, tension is suddenly applied to the slackened tape 8 and the tape 8 will be damaged thereby. This risk occurs when the loading ring 2 is fully stopped at the completion of the loading operation and the torque applied to the take-up reel to resist unwinding therefrom, is then effective to suddenly tension the previously slackened tape.

OBJECTS AND SUMMARY OF THE INVENTION

Accordingly, it is an object of the present invention to provide an improved tape loading apparatus which avoids the foregoing problems of the prior art.

It is another object of the present invention to provide loading apparatus which can prevent a tape slackening of the tape and/or the sudden tensioning thereof.

It is a further object of the present invention to provide a tape loading apparatus which can effectively prevent a tape from being damaged.

According to an aspect of the present invention, there is provided, in a magnetic tape cassette recording and/or reproducing device including a cylindrical tape guide drum having at least one rotary head associated therewith for recording and/or reproducing signals on a magnetic tape wrapped around the drum, a cassette holder spaced from said drum for operatively positioning a tape cassette containing supply and take-up reels on which said magnetic tape is wound, and a tape loading apparatus operative in a loading operation to withdraw said magnetic tape from the operatively positioned tape cassette and to wrap the withdrawn tape about said drum: the combination of a supply reel motor and a take-up reel motor for applying torques resisting rotations of said supply reel and take-up reel, respectively, of the operatively positioned tape cassette in directions for unwinding the tape therefrom; loading ring means having guide means positioned thereon for withdrawing the tape when said loading ring means is rotated in a loading operation; loading ring driving means for rotatably driving said loading ring means; rotation detecting means for detecting the rotation of said loading ring means and generating a detected signal indicating the rotational position of said loading ring means; and control means for controlling the speed of rotation of the loading ring means by said loading ring driving means in accordance with said detected signal.

The above, and other objects, advantages and features of the present invention, will become apparent from the following detailed description of the illustrative embodiment to be taken in conjunction with the accompanying drawings, throughout which like reference numerals identify the same or similar parts.

DETAILED DESCRIPTION OF THE PREFERRED EMBODIMENT

Figure 1B:
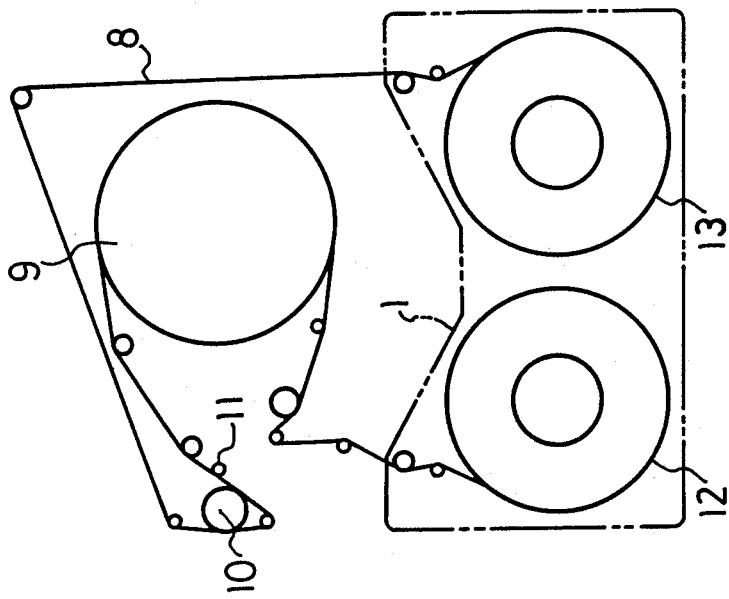
FIGS. 1A and 1B are diagrammatic views of a known video tape recorder to which reference is made in explaining the loading operation of the tape.
Figure 1A:
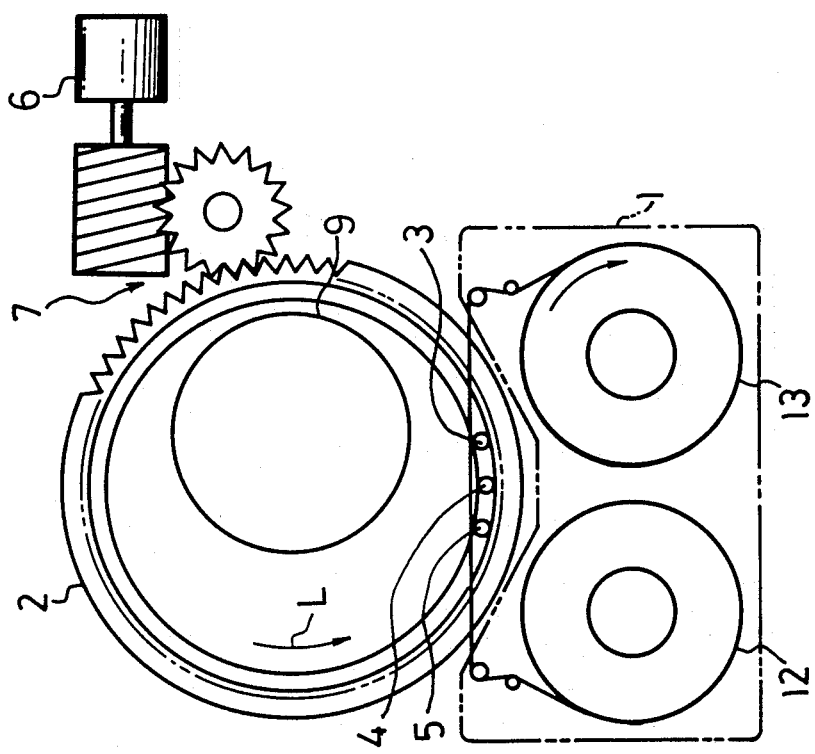
Figure 2A:
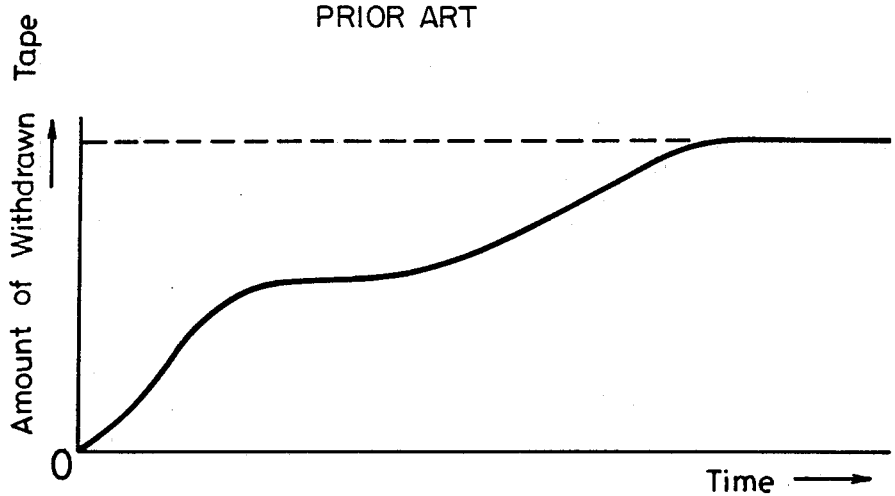
FIGS. 2A and 2B are respective graphs to which reference is made in explaining a problem encountered in the prior art.
Figure 2B:
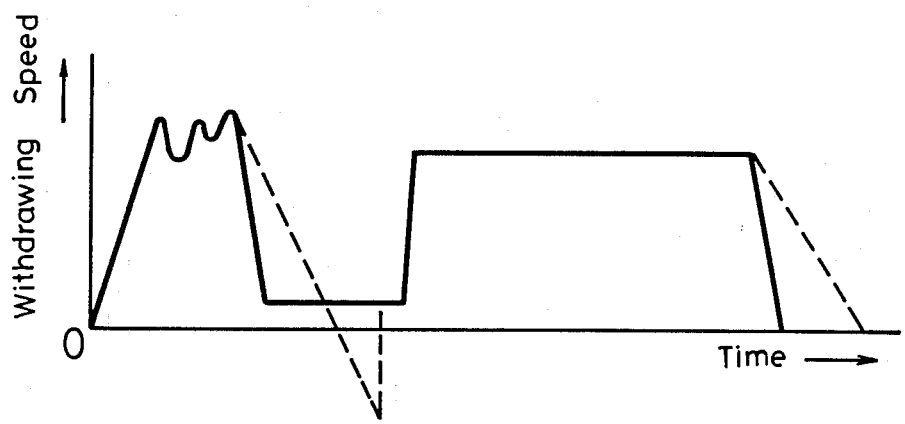

Now, an embodiment of a tape loading apparatus according to an embodiment of the present invention will be described in detail with reference to FIG. 3 of the drawings in which parts corresponding to those of FIGS. 1A and 1B are marked with the same references and therefore need not be described in detail.

Figure 3:
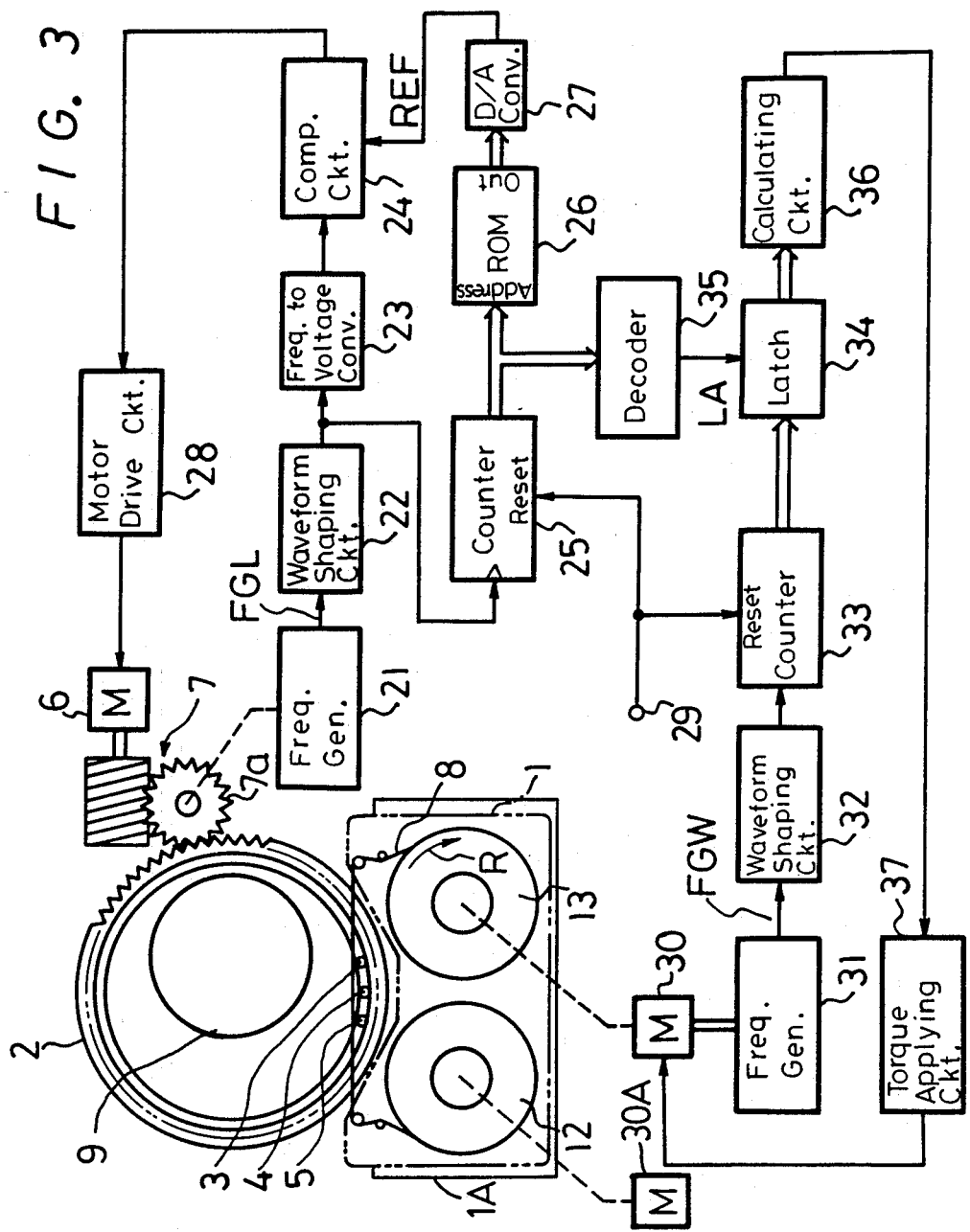
FIG. 3 is a block diagram showing an embodiment of a tape loading apparatus according to the present invention and which is shown associated with a video tape recorder of the type shown in FIGS. 1A and 1B.

As illustratd in FIG. 3, in accordance with this embodiment, during a loading operation, a reel drive motor 30A for the supply reel 12 applies a braking force to prevent the supply reel 12 from rotating similarly as described above. In accordance with this invention, however, the rotating speed of the loading ring 2 is not made constant but it is controlled to change in accordance with the loading position. Further, in accordance with this invention the torque applied to the take-up reel 13 in the direction opposite to the tape withdrawing direction is varied in accordance with the radius or amount of the tape 8 wound on the take-up reel 13. Thus, the tape 8 can be more effectively protected from being damaged.

More specifically, in the illustrated embodiment, a frequency generator 21 is coaxially connected with a worm wheel 7a of the worm gear assembly 7 which rotates the load ring 2. Since the rotating speed of the worm wheel 7a is proportional to the rotating speed of the loading ring 2, the frequency generator 21 generates a frequency signal FGL or chain of pulses at a frequency corresponding to the rotating speed of the loading ring 2.

This frequency signal FGL is supplied through a waveform shaping circuit 22 to a frequency-to-voltage converting circuit 23 which generates a voltage signal corresponding to the frequency of the signal FGL. This voltage signal is supplied to one input of a comparing circuit 24.

The comparing circuit 24 compares this voltage signal from circuit 23 with a suitably varied reference voltage REF, which will be described later, to produce a difference voltage corresponding to the difference therebetween. The difference voltage from comparing circuit 24 is supplied to a motor driven circuit 28 which correspondingly controls the rotating speed of the motor 6. Thus, the loading ring 2 is controlled to rotate at a rotating speed corresponding to the varying reference voltage REF.

In the illustrated embodiment, the rotating speed of the loading ring 2 is controlled by changing the reference voltage REF supplied to the comparing circuit 24 in accordance with the amount of the tape 8 which has been withdrawn from the tape cassette 1, that is, in accordance with the loading position.

Specifically, the frequency signal FGL, after passing through the waveform shaping circuit 22, is supplied to a clock terminal of a counter 25. The counter 25 is reset by a reset signal applied thereto from a terminal 29 at the initiation of the loading operation, and it counts the pulses of signal FGL up "0", "1", "2", ... as the loading ring 2 rotates. The count value of output from the counter 25 is supplied to a ROM (read-only-memory) 26 as an address signal for the latter.

Figure 4A:
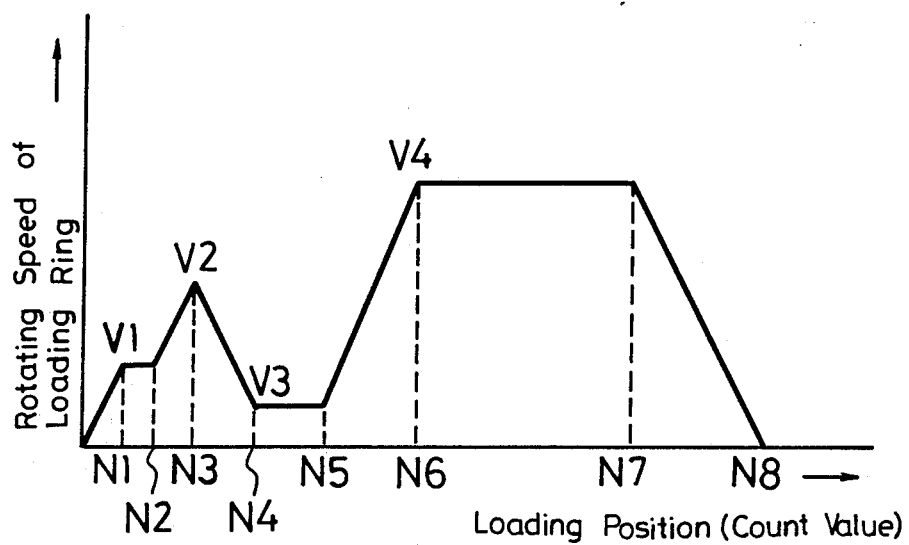
FIGS. 4A and 4B are graphs to which reference will be made in explaining the operation of the apparatus according to the present invention.

The count value of the counter 25 corresponds to the amount of rotation of the loading ring 2. This amount corresponds to the loading position. The ROM 26 stores, at its various addresses, digital values corresponding to the reference voltage REF needed at respective loading positions to change the rotating speed of the loading ring 2 in accordance with the graph shown in FIG. 4A. In FIG. 4A, N1, N2, ... N8 denote respective count values or loading positions, for example, N8 = 500 at the completion of the loading operation. The ROM 26 sequentially stores the digital values of the reference voltage REF which changes rectilinearly in response to the position of every pulse or wave of the frequency signal FGL such that the rotating speed of the loading ring 2 is changed rectilinearly up to the loading position represented by the count value N1 or up to a speed V1 from the beginning of rotation of the loading ring 2.

As the count value of the counter 25 is changed with the rotation of the loading ring 2, a digital value of the reference voltage REF, which is sequentially changed, is sequentially read from the ROM 26, converted into a voltage by a D/A (digital-to-analog) converter 27 and then fed to the comparing circuit 24 as the reference voltage REF.

Figure 4B:
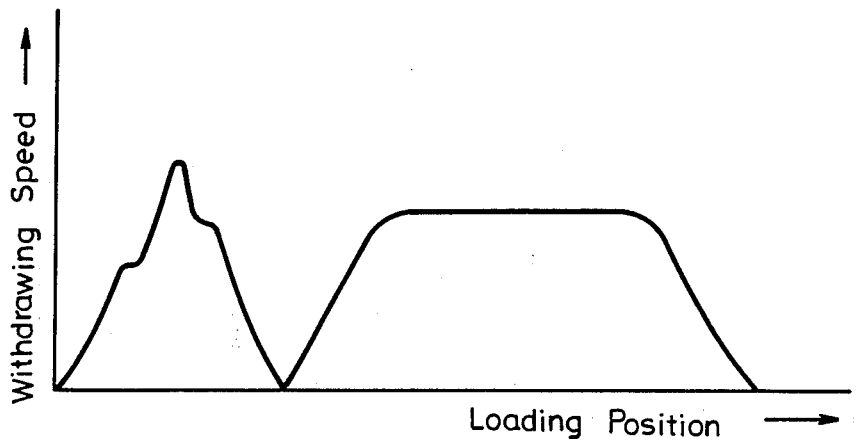

Therefore, the loading ring 2 rotates is turned by the motor 6 with different rotating speeds as shown in FIG. 4A and the tape 8 is withdrawn from the tape cassette 1 at less sharply changing speeds as represented by a curve in FIG. 4B, thus preventing damage to the tape 8.

As earlier noted, and further according to the present invention, the torque applied to the take-up reel 13 for resisting the unwinding of tape therefrom during the loading operation is varied in accordance with the radius of the tape 8 wound on the take-up reel 13, so as to more effectively protect the tape 8 from being damaged.

More specifically, as illustrated in FIG. 3, a drive motor 30 is provided to urge the take-up reel 13, to rotate in the direction of the arrow R, and a frequency generator 31 is provided to generate a frequency or pulse signal FGW at a frequency corresponding to the rotational speed of the drive motor 30. The frequency signal FGW is supplied through a waveform shaping circuit 32 to a clock terminal of a counter 33. At the indication of a loading operation, this counter 33 is reset by the reset signal applied from the terminal 29, similarly to the counter 25. Thus, when the loading operation begins and the tape 8 is withdrawn from the take-up reel 13 which is thereby rotated against the torque applied by the motor 30, the frequency generator 31 generates the frequency signal FGW with the number of pulses of the signal FGW corresponding to the amount of the rotational movement of take-up reel 13 to permit the counter 33 to count up "0", "1", "2", ... Therefore, the count value of the counter 33 is equal to the angle of rotational of the take-up reel 13 from a starting point of the loading operation.

The count output from the counter 33 is supplied to a latch circuit 34. At the same time, the count output from the counter 25 which counts the signal FGL is supplied to a decoder 35. When the counter 25 counts a predetermined value N, the decoder 35 produces a pulse LA. This pulse LA is supplied to the latch circuit 34 as a latch pulse by which the count value of the counter 33 at that time is latched in the latch circuit 34.

In the illustrated embodiment, the count value N detected by the decoder 35 to provide the latch pulse LA is selected to be within a range of count values in which the speed of rotation of the loading ring 2, and hence the rate at which the tape is being withdrawn from the cassette, is changing rectilinearly from the loading starting point. Thus, as will be clear from the curve in FIG. 4A, the count value is selected to be smaller than N1. Within this range, the count value of the counte 25 is in proportion to the amount of the tape 8 is withdrawn from the tape cassette 1. Therefore, the latch circuit 34 latches the count value from counter 33, that is, number of pulses or waves of the signal FGW, corresponding to the angle of rotation of the take-up reel 13 for the withdrawal from the tape cassette 1 of a predetermined length l represented by the count value N. The latched value or output from the latch circuit 34 is supplied to a calculating circuit 36. The calculating circuit 36 calculates the radius of the tape 8 wound on the take-up reel 13 from the known length l and the angle of rotation of the take-up reel for unwinding or withdrawing that known length, that is, the output from the latch circuit 34. The thus obtained calculator output indicating the radius of the tape 8 wound on the take-up reel 13 is supplied to a torque applying circuit 37 which applies a torque signal corresponding to the indicated radius to the driven motor 30 to bias or urge the take-up reel 13 in the direction indicated by the arrow R in FIG. 3.

In practice, the calculating circuit 36 may be formed of a microcomputer for calculating the radius of the tape 8 wound on the take-up reel 13. Alternatively, since the length l of the withdrawn tape 8 is constant and is already known, data indicating radii corresponding to various count values that may be latched in the latch circuit 34 may be stored at respective addresses in in a ROM and the output from the latch circuit 34 may be supplied to this ROM as an address. In this case, data indicating the radius of the tape 8 wound on the take-up reel 13 and rectilinearly corresponding to the count value is not stored in the ROM. Rather, the stored data are indicative of approximate radii for respective predetermined ranges of the count values of counter 33.

In the above described embodiments, the torque applied to the take-up reel 13 is changed in accordance with the radius of the tape 8 wound on the take-up reel 13. However, even if a constant torque is applied to the take-up reel 13 as in the prior art, the likelihood of damage to the tape 8 can be considerably reduced, as compared with the prior art, by the described variation of the speed of rotation of the loading ring 2 during a loading operation. The optimum rotating speeds of the loading ring 2 during the loading operation can be determined by various experiments and simulations. It is needless to say that the thus obtained optimum rotating speed data may be stored in the ROM 26.

According to the present invention, as set forth above, since the rotating speed of the loading ring is changed in accordance with the loading position, sharp changes in the speed at which the tape is withdrawn from the tape cassette can be prevented. Therefore, even when a constant torque is applied to the take-up reel, and the tape cassette is large-sized and the inertia of the take-up reel becomes large, slackening followed by extreme tensioning of the tape can be usually avoided. Thus, the tape can be protected from being damaged.

Although a preferred embodiment of the present invention has been described above with reference to the accompanying drawings, it is to be understood that the invention is not limited thereto, and that many modifications and variations could be effected therein by one with ordinary skill in the art without departing from the spirit and scope of the invention as defined by the appended claims.

I claim as my invention:

1. In a magnetic tape cassette recording and/or reproducing device including a cylindrical tape guide drum having at least one rotary head associated therewith for recording and/or reproducing signals on a magnetic tape wrapped around the drum, a cassette holder spaced from said drum for operatively positioning a tape cassette containing supply and take-up reels on which said magnetic tape is wound, and a tape loading apparatus operative in a loading operation to withdraw said magnetic tape from the operatively positioned tape cassette and to wrap the withdrawn tape about said drum:

the combination of a supply reel motor and a take-up reel motor for applying torques resisting rotations of said supply reel and take-up reel, respectively, of the operatively positioned tape cassette in directions for unwinding the tape therefrom;

loading ring means having guide means thereon for withdrawing the tape from the operatively positioned cassette when said loading ring means is rotated in a loading operation;

loading ring driving means for rotatably driving said loading ring means;

rotation detecting means for detecting the rotation of said loading ring means and generating a detected signal indicating the rotational position of said loading ring means;

control means for controlling the speed of rotation of said loading ring means by said loading ring driving means in accordance with said detected signal; and take-up reel motor control means including detecting means for detecting the amount of the tape wound on one of said supply and take-up reels of the operatively positioned tape cassette, and torque control means for determining the torque applied to said take-up reel in acccordance with the detected amount of wound tape on said one of the reels.

2. A device according to claim 1, wherein said means for detecting the amount of wound tape includes a frequency generator for detecting the rotation of said take-up reel, counter means for counting the output of said frequency generator, latch means controlled by a latch signal generated in response to the output signal of said loading ring rotation detecting means and latching the output of said counter means, and calculating means for calculating the radius of the wound tape based on the output of said latch means.

3. In a magnetic tape cassette recording and/or reproducing device including a cylindrical tape guide drum having at least one rotary head associated therewith for recording and/or reproducing signals on a magnetic tape wrapped around the drum, a cassette holder spaced from said drum for operatively positioning a tape cassette containing supply and take-up reels on which said magnetic tape is wound, and a tape loading apparatus operative in a loading operation to withdraw said magnetic tape from the operatively positioned tape cassette and to wrap the withdrawn tape about said drum:

the combination of a supply reel motor and a take-up reel motor for applying torques resisting rotations of said supply reel and take-up reel, respectively, of the operatively positioned tape cassette in directions for unwinding the tape therefrom;

loading ring means having guide means thereon for withdrawing the tape from the operatively positioned cassette when said loading ring means is rotated in a loading operation;

loading ring device means for rotatably driving said loading ring means and which includes a loading ring drive motor and gear means for transmitting the rotation of said loading ring drive motor to said loading ring means;

rotation detecting means for detecting the rotation of said loading ring means and generating a detected signal indicating the rotational position of said loading ring means, said rotation detecting means including a frequency generator for generating an output signal at a frequency corresponding to the rotational speed of said loading ring means as the latter is rotated; and control means for controlling the speed of rotation of said loading ring means by said loading ring driving means in accordance with said detected signal.

4. A device according to claim 3, wherein said control means includes means for providing a signal value that varies with said frequency of the output signal, a comparator for comparing said signal value and a reference value generated by a reference signal generator and generating a control signal supplied to said loading ring drive motor.

5. A device according to claim 4, wherein said reference signal generator includes counter means for counting the output signal of said frequency generator and providing a changing count value, read-only-memory means for storing a plurality of reference values at respective addresses, said count value from said counter means being supplied to said read-only-memory means as an address signal, and a D/A (digital-to-analog) converter for converting the output signal of said read-only-memory means to an analog signal constituting said reference value.

6. In a magnetic tape cassette recording and/or reproducing device including a tape guide drum having at least one rotary head associated therewith for recording and/or reproducing signals on a magnetic tape wrapped around the drum, a cassette holder spaced from the drum for operatively positioning a tape cassette containing supply and take-up reels on which the magnetic tape is wound, and a tape loading apparatus operative in a loading operation to withdraw said magnetic tape from the operatively positioned tape cassette and to wrap the withdrawn tape about said drum:

the combination of means for applying torques resisting rotations of said supply reel and take-up reel of the operatively positioned tape cassette in respective directions for unwinding the tape therefrom;

loading ring means having guide means thereon for withdrawing the tape from an operatively positioned cassette when said loading ring means is rotated in a loading operation;

loading ring dividing means for rotatably driving said loading ring means;

rotation detecting means for detecting the rotation of said loading ring means and generating a detected position signal indicating the rotational position of said loading ring means;

speed control means for controlling the speed of rotation of said loading ring means by said loading ring driving means in accordance with the rotational position of said loading ring means as indicated by said detected position signal;

means for detecting the amount of tape wound on said take-up reel; and torque control means for controlling the amount of said torque applied to said take-up reel for resisting unwinding of the tape therefrom in accordance with the detected amount of tape wound on said take-up reel.

7. In a magnetic tape cassette recording and/or reproducing device including a tape guide drum having at least one rotary head associated therewith for recording and/or reproducing signals on a magnetic tape wrapped around the drum, a cassette holder spaced from the drum for operatively positioning a tape cassette containing supply and take-up reels on which the magnetic tape is wound, and a tape loading apparatus operative in a loading operation to withdraw said magnetic tape from the operatively positioned tape cassette and to wrap the withdrawn tape about said drum:

the combination of means for applying torques resisting rotations of said supply reel and take-up reel of the operatively positioned tape cassette in directions for unwinding the tape therefrom;

loading ring means having guide means thereon for withdrawing the tape from an operatively positioned cassette when said loading ring means is rotated in a loading operation;

loading ring driving means for rotatably driving said loading ring means;

rotation detecting means including a first frequency generator for generating a pulse signal at a frequency corresponding to the rotational speed of said loading ring means as the latter is rotated, and a first counter for counting pulses of said pulse signal and providing a first count value indicative of the rotational position of said loading ring means;

control means responsive to said first count value for determining said speed of rotation of said loading ring means by said loading ring driving means in accordance with the rotational position of said loading ring means;

means for detecting the amount of tape wound on said take-up reel including a second frequency generator for generating a second pulse signal at a frequency corresponding to the rotation of said take-up reel, a second counter for counting pulses of said second pulse signal in response to rotation of said take-up reel by withdrawal of the tape therefrom during said loading operation so as to provide a second count value, latch means receiving said second count value, and means responsive to said first count value for causing said latch means to latch said second count value upon a predetermined rotation of said loading ring means from the commencement of said loading operation so that the latched second count value is indicative of the amount of tape wound on said take-up reel; and means responsive to said latched second count value for varying the amount of said torque applied to said take up reel for resisting unwinding of the tape therefrom in accordance with the detected amount of tape wound on said take-up reel.

* * * * *